(12) United States Patent
Hsu

(10) Patent No.: US 11,438,448 B2
(45) Date of Patent: Sep. 6, 2022

(54) NETWORK APPLICATION PROGRAM PRODUCT AND METHOD FOR PROCESSING APPLICATION LAYER PROTOCOL

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 380 days.

(21) Appl. No.: 16/707,542

(22) Filed: Dec. 9, 2019

(65) Prior Publication Data

US 2020/0204661 A1 Jun. 25, 2020

(30) Foreign Application Priority Data

Dec. 22, 2018 (TW) .................................. 107146695

(51) Int. Cl.
*H04L 69/329* (2022.01)
*H04L 69/22* (2022.01)
(Continued)

(52) U.S. Cl.
CPC ............ *H04L 69/329* (2013.01); *H04L 47/20* (2013.01); *H04L 47/2483* (2013.01);
(Continued)

(58) Field of Classification Search
CPC ... H04L 47/20; H04L 47/2483; H04L 47/803; H04L 67/40; H04L 69/02; H04L 69/22; H04L 69/26; H04L 69/329
See application file for complete search history.

(56) References Cited

U.S. PATENT DOCUMENTS 5,781,743 A * 7/1998 Matsuno ............. H04L 67/2842
709/228
6,851,061 B1 * 2/2005 Holland, III .......... H04L 69/163
709/224
(Continued)

FOREIGN PATENT DOCUMENTS

CN 103532782 1/2014

OTHER PUBLICATIONS

WinPcap, "NPF driver internals manual", Aug. 30, 2003. https://www.winpcap.org/docs/docs_412/html/group__NPF.html.

*Primary Examiner* — Dung B Huynh
(74) *Attorney, Agent, or Firm* — WPAT, PC

(57) ABSTRACT

A network application program product and a method for processing an application layer protocol are provided. The network application program product includes a network application program executed in a user mode and a packet filtering module executed in a kernel mode. The network application program transmits connection information, associated with network connection to the network application program, to the packet filtering module. The packet filtering module captures a to-be-processed packet on the network connection according to the connection information; analyzes the to-be-processed packet into at least one protocol data unit; compares the protocol data unit with preset code content; and transmits the protocol data unit to the network application program or the data access module according to the comparison result for later processing.

11 Claims, 4 Drawing Sheets

(51) Int. Cl.
  *H04L 69/00* (2022.01)
  *H04L 47/20* (2022.01)
  *H04L 47/80* (2022.01)
  *H04L 47/2483* (2022.01)
(52) U.S. Cl.
  CPC ............ *H04L 47/803* (2013.01); *H04L 69/02* (2013.01); *H04L 69/22* (2013.01); *H04L 69/26* (2013.01)

(56) References Cited

U.S. PATENT DOCUMENTS

| | | | | |
|---|---|---|---|---|
| 7,203,774 | B1* | 4/2007 | Zhou | G06F 9/4411 710/17 |
| 7,448,049 | B1* | 11/2008 | Xing | G06F 9/54 709/200 |
| 7,735,100 | B1* | 6/2010 | Sallam | G06F 21/56 716/132 |
| 9,092,426 | B1* | 7/2015 | Bathija | G06F 12/1081 |
| 2003/0007488 | A1* | 1/2003 | Rao | H04L 49/9073 370/432 |
| 2003/0046366 | A1* | 3/2003 | Pardikar | H04L 63/0464 709/219 |
| 2004/0252711 | A1* | 12/2004 | Romano | H04L 47/50 370/412 |
| 2006/0179484 | A1* | 8/2006 | Scrimsher | G06F 21/568 726/23 |
| 2007/0011358 | A1* | 1/2007 | Wiegert | H04L 47/30 709/250 |
| 2007/0165672 | A1* | 7/2007 | Keels | H04L 1/0061 370/392 |
| 2007/0255866 | A1* | 11/2007 | Aloni | H04L 69/161 710/52 |
| 2008/0013448 | A1* | 1/2008 | Horie | H04L 67/1097 370/229 |
| 2008/0117911 | A1* | 5/2008 | Rajakarunanayake | H04L 47/193 370/392 |
| 2008/0244738 | A1* | 10/2008 | Shiozawa | G06F 21/6218 726/21 |
| 2010/0027540 | A1* | 2/2010 | Sato | H04L 67/2842 370/389 |
| 2010/0146127 | A1* | 6/2010 | Schmieder | G06F 9/545 709/228 |
| 2011/0185068 | A1* | 7/2011 | Schmieder | H04L 69/14 709/227 |
| 2011/0185071 | A1* | 7/2011 | Schmieder | H04L 69/26 709/228 |
| 2011/0219112 | A1* | 9/2011 | Fagg | H04L 43/0811 709/224 |
| 2012/0137086 | A1* | 5/2012 | Oe | G06F 3/0659 711/E12.001 |
| 2012/0265837 | A1* | 10/2012 | Grant | H04L 67/025 709/212 |
| 2013/0023242 | A1* | 1/2013 | Qian | H04W 4/14 455/412.1 |
| 2014/0075539 | A1* | 3/2014 | Zuk | H04L 63/0227 726/13 |
| 2014/0254368 | A1* | 9/2014 | Zhang | H04L 47/122 370/235 |
| 2015/0281407 | A1* | 10/2015 | Raju | H04L 69/163 718/1 |
| 2016/0099969 | A1* | 4/2016 | Angus | H04L 63/20 713/158 |
| 2016/0380984 | A1* | 12/2016 | Johnson | H04L 63/0485 713/153 |
| 2017/0041960 | A1* | 2/2017 | Quan | H04W 48/12 |
| 2017/0192979 | A1* | 7/2017 | Yang | G06F 16/188 |
| 2018/0129533 | A1* | 5/2018 | Pashov | H04L 69/16 |
| 2018/0278686 | A1* | 9/2018 | Sprague | H04L 49/90 |
| 2018/0307833 | A1* | 10/2018 | Noeth | H04L 63/1416 |
| 2019/0065404 | A1* | 2/2019 | Kabra | G06F 12/0897 |
| 2020/0036699 | A1* | 1/2020 | Suresh | H04L 63/083 |
| 2020/0204661 | A1* | 6/2020 | Hsu | H04L 47/2483 |
| 2020/0249874 | A1* | 8/2020 | Foo | G06F 13/287 |
| 2021/0105682 | A1* | 4/2021 | Yadhav | H04L 67/148 |

* cited by examiner

NETWORK APPLICATION PROGRAM PRODUCT AND METHOD FOR PROCESSING APPLICATION LAYER PROTOCOL

FIELD OF THE INVENTION

The present disclosure relates to a method for processing an application layer protocol, and particularly to a network application program product for processing different types of network packets and a related method for processing an application layer protocol.

BACKGROUND OF THE INVENTION

Network application programs are now widely used. The design period and the running efficiency of a network application program are important indices to evaluate the network application program. Therefore, it is desired to develop a network application program with high running efficiency in a short design period. From the designer's viewpoint, a network application program designed to be executed in a user mode of an operating system is advantageous over that designed to be executed in a kernel mode of the operating system. The main reasons are that shorter design period is required, running on different operating systems may be achieved by less effort, and troubleshooting of the network application program is easier. However, the user-mode network application programs still have drawbacks. For example, frequent data duplication significantly reduces the running efficiency, and the programs can not support novel data access such as remote direct memory access (RDMA).

On the contrary, although the kernel-mode network application programs can provide better running efficiency, it is difficult to develop. Once errors occur during the operation of the network application programs, it is likely to affect the operation of the operating system, and even causes unexpected crash.

Therefore, how to develop an application program which can provide high efficiency and is easy to maintain is an important issue in the field.

SUMMARY OF THE INVENTION

An aspect of the present disclosure provides a network application program product executed in an operating system which provides a user mode and a kernel mode. A data access module operates in the kernel mode of the operating system to perform data access to a storage device. The network application program product includes a network application program and a packet filtering module. The network application program is executed in the user mode and obtains an access right to a data storage area in the storage device through the operating system. Network connection is established between the network application program and an external device through the operating system. The network application program generates connection information associated with the network connection. The packet filtering module is executed in the kernel mode. The packet filtering module captures at least one to-be-processed packet transmitted from the external device via the network connection according to the connection information, analyzes the to-be-processed packet into at least one protocol data unit, compares the protocol data unit with preset code content to obtain a comparison result, and transmits the protocol data unit to the network application program or the data access module according to the comparison result to make the network application program or the data access module to operate in response to the protocol data unit.

In an embodiment, the packet filtering module further includes at least one packet capturing module and a data unit-processing module. The packet capturing module captures the to-be-processed packet according to the connection information and analyzes the to-be-processed packet into the protocol data unit. The data unit-processing module receives the protocol data unit from the packet capturing module and compares the protocol data unit with the preset code content to generate the comparison result. When the comparison result shows that the protocol data unit is consistent with the preset code content, the data unit-processing module instructs the data access module to perform the data access to the storage device according to the protocol data unit.

In an embodiment, when the comparison result shows that the protocol data unit is inconsistent with the preset code content, the data unit-processing module forwards the protocol data unit to the network application program.

In an embodiment, the data unit-processing module modifies the protocol data unit and forwards the modified protocol data unit to the network application program to allow the network application program to keep normal operation when another data access has been performed before the protocol data unit is captured.

In an embodiment, the data unit-processing module modifies the protocol data unit by modifying a transmission sequence code of the protocol data unit. The transmission sequence code represents a position of the protocol data unit in a transmission sequence.

Another aspect of the present disclosure provides a method for processing an application layer protocol used with an operating system which provides a user mode and a kernel mode. A network application program is executed in the user mode, and a data access module configured to perform data access to a storage device and a packet filtering module corresponding to the network application program are executed in the kernel mode. The packet filtering module stores therein preset code content. At first, the network application program transmits connection information to the packet filtering module wherein the connection information is associated with network connection established between the network application program and an external device through the operating system. Subsequently, the packet filtering module captures at least one to-be-processed packet on the network connection according to the connection information; analyzes the to-be-processed packet into at least one protocol data unit; compares the protocol data unit with the preset code content to obtain a comparison result; and transmits the protocol data unit to the network application program for processing or instructs the data access module to process according to the comparison result.

In an embodiment, when the comparison result shows that the protocol data unit is inconsistent with the preset code content, the packet filtering module transmits the protocol data unit to the network application program and the network application program processes the protocol data unit.

In an embodiment, the packet filtering module modifies the protocol data unit and transmits the modified protocol data unit to the network application program.

In an embodiment, the method further includes the following steps. The network application program responds to the packet filtering module with a processing result of the protocol data unit; and the packet filtering module receives the processing result from the network application program and transmits the processing result to the external device. If the packet filtering module modifies the protocol data unit transmitted to the network application program, the packet filtering module further modifies the processing result and transmits the modified processing result to the external device.

In an embodiment, when the comparison result shows that the protocol data unit is consistent with the preset code content, the packet filtering module instructs the data access module to perform the data access to the storage device according to the protocol data unit.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Generally speaking, a central processing unit (CPU) provides at least two privilege levels, e.g. user mode and kernel mode. In the kernel mode, specific instructions for directly controlling the hardware are available. On the contrary, these specific instructions can not be used in the user mode. If all programs are allowed to control the hardware arbitrarily without any dispatching mechanism, collisions would occur in the hardware when these programs are executed simultaneously. In this situation, an operating system can solve the collision problem effectively.

To arrange the hardware-related requests from various programs, the operating system also provides two operation modes, i.e. user mode and kernel mode. A program executed in the kernel mode of the operating system can operate the hardware directly, while a program executed in the user mode of the operating system need make a system call provided by the operating system to execute the program in the kernel mode to operate the hardware. Therefore, the programs which want to operate the hardware are under the control of the operating system. The operating system can arrange a schedule to sequence the hardware-related requests to avoid that collisions occur in the hardware or a specific program (e.g. malware) takes a grip on the hardware for a long time.

Figure 1A:
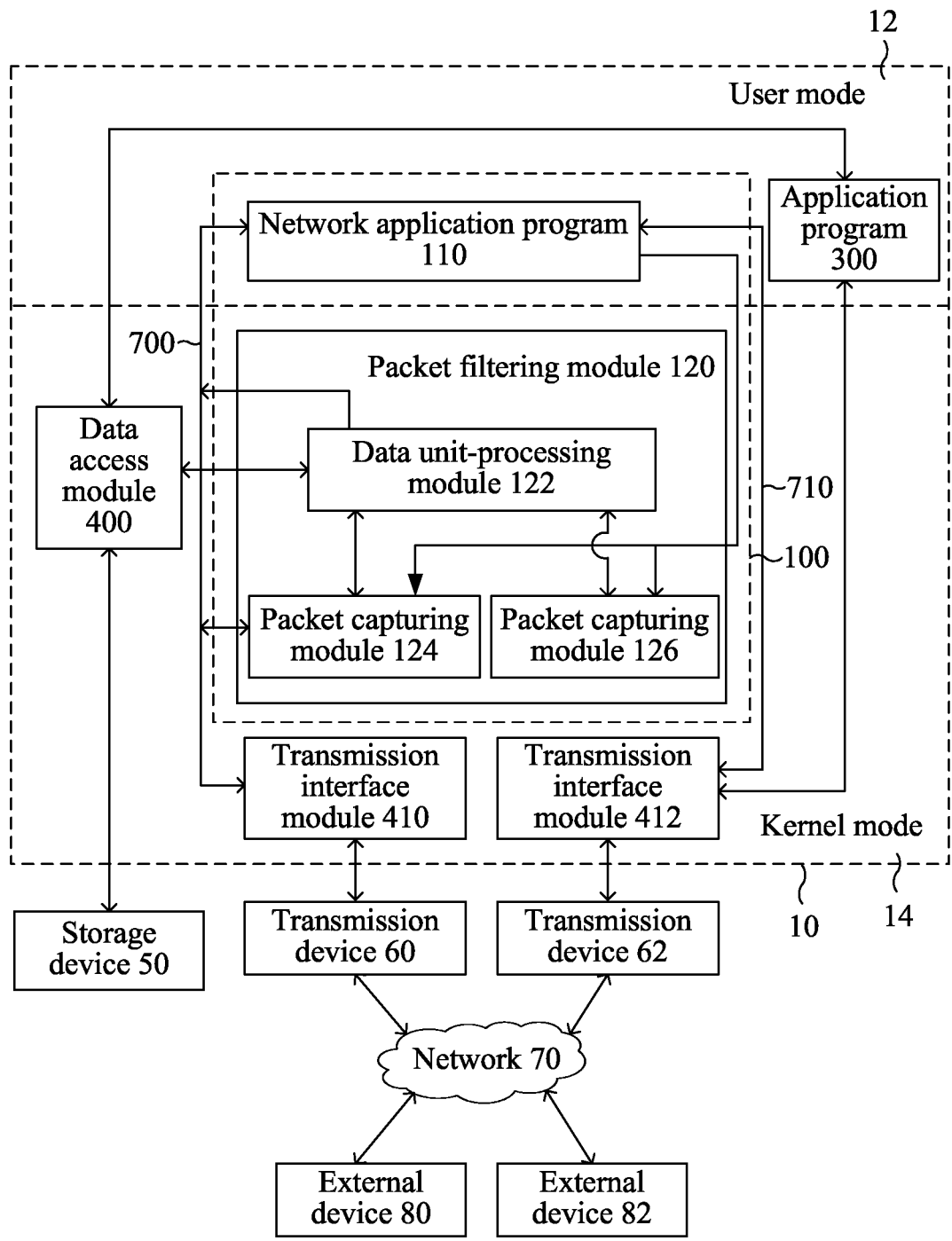
FIG. 1A is a module block diagram illustrating that a network application program product running on an existing operating system according to an embodiment of the present disclosure.

Please refer to FIG. 1A, which is a module block diagram illustrating that a network application program product running on an existing operating system according to an embodiment of the present disclosure. The operating system 10 provides a user mode 12 and a kernel mode 14, and a data access module 400 and transmission interface modules 410, 412 are provided in the kernel mode 14. The data access module 400 is configured to access a storage device 50, the transmission interface module 410 is configured to transmit data from/to the transmission device 60, and the transmission interface module 412 is configured to transmit data from/to the transmission device 62. The storage device 50, the transmission device 60 and the transmission device 62 are hardware controllable and operable by the operating system or the central processing unit. For example, the storage device is a random access memory or a hard disk drive. The transmission device 60 and the transmission device 62 are hardware adopting different communication protocols, e.g. TCP/IP port adopting Transmission Control Protocol (TCP)/Internet Protocol (IP) and RDMA port supporting remote direct memory access (RDMA).

As shown in the diagram, the application program 300 executed in the user mode 12 can make a system call to request the transmission interface module (e.g. the transmission interface module 412) executed in the kernel mode 14 to control the transmission device 62 to establish connection to a external device (e.g. external device 80) via the network 70. On the other hand, the application program 300 can make another system call to request the data access module 400 executed in the kernel mode 14 to perform data access to the storage device 50. When the external device 80 wants to write data into the storage device 50 through the operation of the application program 300, the data should be transferred from the external device 80 to the transmission interface module 412 through the network 70 and the transmission device 62 and than temporarily stored in the transmission interface module 412. Subsequently, the application program 300 makes a system call to transfer the data temporarily stored in the transmission interface module 412 to the application program 300. At last, another system call is made to make the data access module 400 to acquire the data temporarily stored in the application program 300, and then the data access module 400 writes the acquired data into the storage device 50. From the description, many system calls are required during the procedure. Further, the data are transferred to the other mode (from the kernel mode to the user mode or from the user mode to the kernel mode) several times. For this reason, it is difficult to raise the overall running efficiency of the application program 300.

Similarly, when the external device 80 wants to read the data stored in the storage device 50 through the operation of the application program 300, many system calls are required and the data need to be transferred between the kernel mode and the user mode several times. It may be seen that the running efficiency is unsatisfactory.

Figure 2:
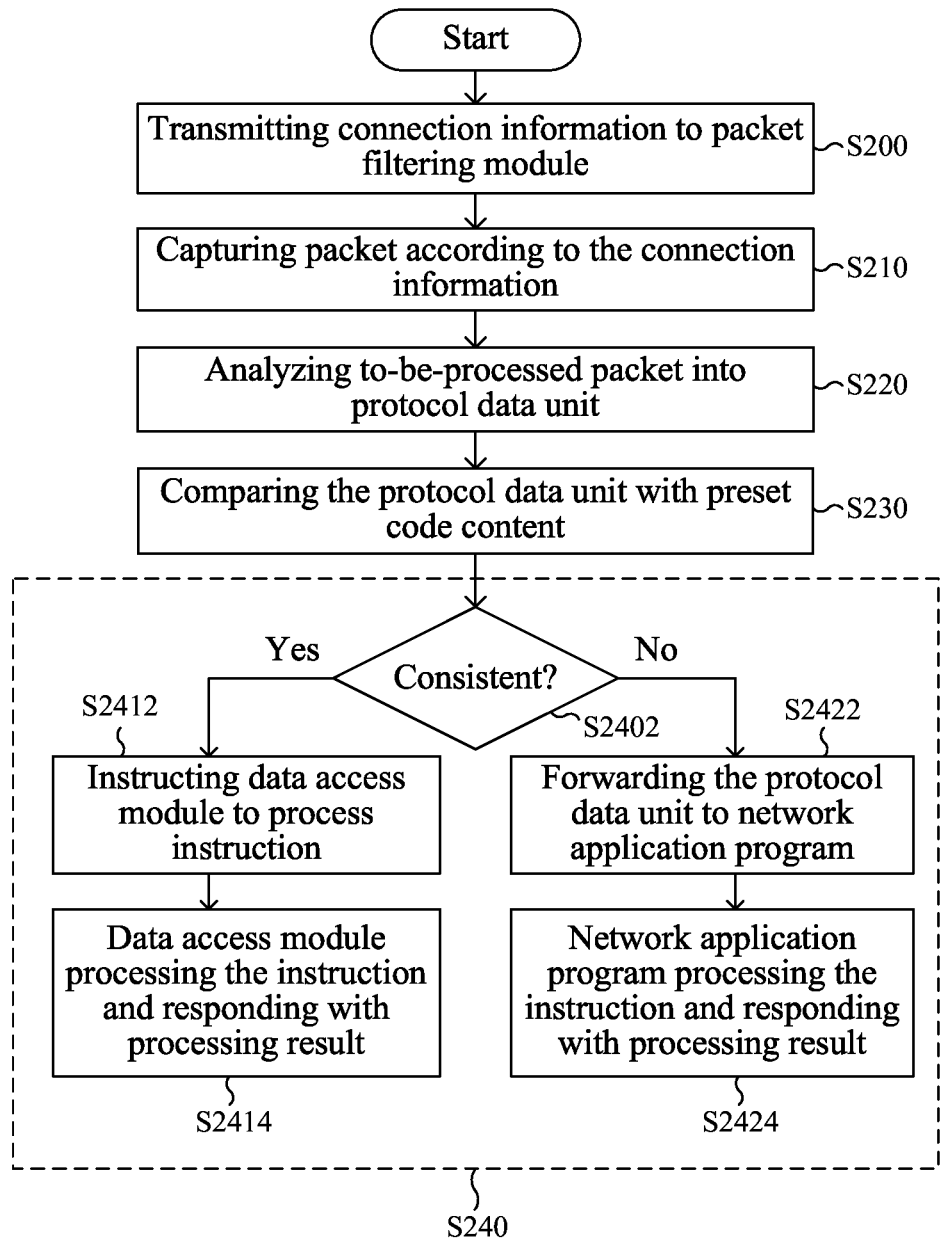
FIG. 2 is a flowchart illustrating a method for processing an application layer protocol according to an embodiment of the present disclosure.

To improve the running efficiency of the application program, a network application program product 100 is provided in the embodiment wherein the network application program product 100 includes a network application program 110 executed in the user mode 12 and a packet filtering module 120 executed in the kernel mode 14. Please refer to both FIG. 1A and FIG. 2 for readily realizing the following description. FIG. 2 is a flowchart illustrating a method for processing an application layer protocol according to an embodiment of the present disclosure. At first, the network application program 110 starts to be executed in the user mode 12 and obtains an access right to a data storage area (not shown) in the storage device 50. When an external device (e.g. the external device 82) wants to make use of the network application program product 100, network connection is established between the network application program product 100 and the external device 82 through the operating system 10, appropriate transmission device (e.g. the transmission device 60) and the network 70. After the network connection is established, the network application program 110 transmits data associated with the network connection (hereinafter referred to connection information) and other data adequate to the operation of the packet filtering module 120 to the packet filtering module 120 at a proper stage (step S200). The storage parameter associated with the accessible data storage area in the storage device 50 may be also included in the connection information. The proper stage could be any preset time point, e.g. immediately after the network connection is just established or the network application program 110 receives an instruction from the external device.

In the embodiment with reference to FIG. 1A, the network application program 110 transmits the connection information to the packet capturing modules 124 and 126 of the packet filtering module 120. The packet capturing module 124/126 judges whether the packet capturing module 124/126 itself has the control right of the network connection associated with the connection information. If the network connection is under the control of the packet capturing module 124/126, the packet capturing module 124/126 captures the network packets transmitted via the network connection (step S210), and analyzes each captured network packet into at least one protocol data unit (PDU) (step S220). After the analysis step, the protocol data unit(s) is/are transmitted to the data unit-processing module 122, and then the data unit-processing module 122 compares the protocol data unit(s) with preset code content to obtain a comparison result (step S230). The data unit-processing module 122 will decide how to handle the protocol data unit(s) according to the comparison result (step S240).

As described above, the network connection between the external device 82 and the network application program 110 is established with the transmission device 60. Therefore, this network connection is controlled by the transmission interface module 410. The packet capturing module 124 does not capture the data transmitted from the transmission interface module 410 to the network application program product 100 until the network application program 110 transmits the connection information to the packet capturing module 124. Hence, the data transmission between the transmission interface module 410 and the network application program 110 is performed via a conventional communication manner (e.g. via the communication channel 700) to achieve bidirectional data transmission before the connection information reaches the packet capturing module 124. In a similar manner, the data transmission between the transmission interface module 412 and the network application program 110 is performed via the communication channel 710 to achieve bidirectional data transmission before the network application program 110 transmits the connection information to the packet capturing module 126. In other words, under the condition that the network application program 110 has not transmitted the connection information to the packet capturing modules 124 and 126, the data transmission between the network application program 110 and the transmission interface modules 410 and 412 is similar to that between the application program 300 and the transmission interface modules 410 and 412.

Once the connection information from the network application program 110 has reached the packet capturing module 124, the packet capturing module 124 starts to capture the data transmitted from the transmission interface module 410 to the network application program 110. That is, the packet capturing module 124 captures the data on the communication channel 700. Under these conditions, in addition to receiving the network packets (hereinafter referred to to-be-processed packets) from the transmission interface module 410 by means of capturing the data on the communication channel 700, the packet capturing module 124 further analyzes each to-be-processed packet from the transmission interface module 410 to generate a corresponding protocol data unit(s), and then transmits the protocol data unit(s) to the data unit-processing module 122.

Similarly, if the received connection information indicates that the data transmitted via the network connection associated with the transmission interface module 412 should be captured, the packet capturing module 126 will operate as the packet capturing module 124 as described above. If the connection information is not transmitted to the packet capturing module 126 or the received connection information is unrelated to the network connection associated with the transmission interface module 412, the packet capturing module 126 is kept idle. Thus, the bidirectional data transmission between the transmission interface module 412 and the network application program 110 is implemented by the communication channel 710 as before.

Subsequently, the data unit-processing module 122 receives the protocol data unit(s) from the packet capturing module 124 and compares the protocol data unit(s) with the preset code content to determine whether the protocol data unit(s) is/are consistent with the preset code content (step S2402). If the comparison result shows that the protocol data unit(s) is/are consistent with a portion of the preset code content, the data unit-processing module 122 instructs the data access module 400 according to the protocol data unit(s) (step S2412). Accordingly, the data access module 400 carries out the instruction carried by the protocol data unit(s) to perform data access to the storage device 50, and then responds to the data unit-processing module 122 with the data access result. The data unit-processing module 122 responds to the external device 82 with the processing result via the network connection (step S2414). Otherwise, if the comparison result shows that the protocol data unit(s) is/are completely inconsistent with the preset code content, the data unit-processing module 122 forwards the protocol data unit(s) back to the communication channel 700 to make the protocol data unit(s) to be transmitted to the network application program 110 via the communication channel 700 (step S2422). After that, the network application program 110 carries out the instructions carried by the protocol data unit(s), and then responds to the external device 82 with the processing result via the network connection (step S2424).

The preset code content used in the comparison step may include a group of instruction codes representing instructions which can be executed by the data access module 400 in response to a direct call from the data unit-processing module 122. It is to be noted that, after analyzing one network packet, the packet capturing module 124/126 may obtain multiple protocol data units, only one protocol data unit or just a part of one protocol data unit. The information carried by the protocol data unit(s) may merely involve instructions or involve both instructions and data.

It is to be noted that when the network application program 110 wants to transmit data to the external device 80 and the packet capturing module 124 is not actuated, the data are directly transmitted from the network application program 110 to the transmission interface module 410 via the communication channel 700. Otherwise, when the network application program 110 wants to transmit data to the external device 80 and the packet capturing module 124 is actuated, the packet capturing module 124 captures the data transmitted from the network application program 110 to the transmission interface module 410 via the communication channel 700, and then transmits the captured data to the data unit-processing module 122. The data unit-processing module 122 judges whether the data should be modified before being transmitted to the transmission interface module 410. After the data unit-processing module 122 confirms that modification to the captured data is unnecessary or makes necessary modification to the captured data, the data are transmitted back to the communication channel 700 to be further transmitted to the transmission interface module 410.

Figure 1B:
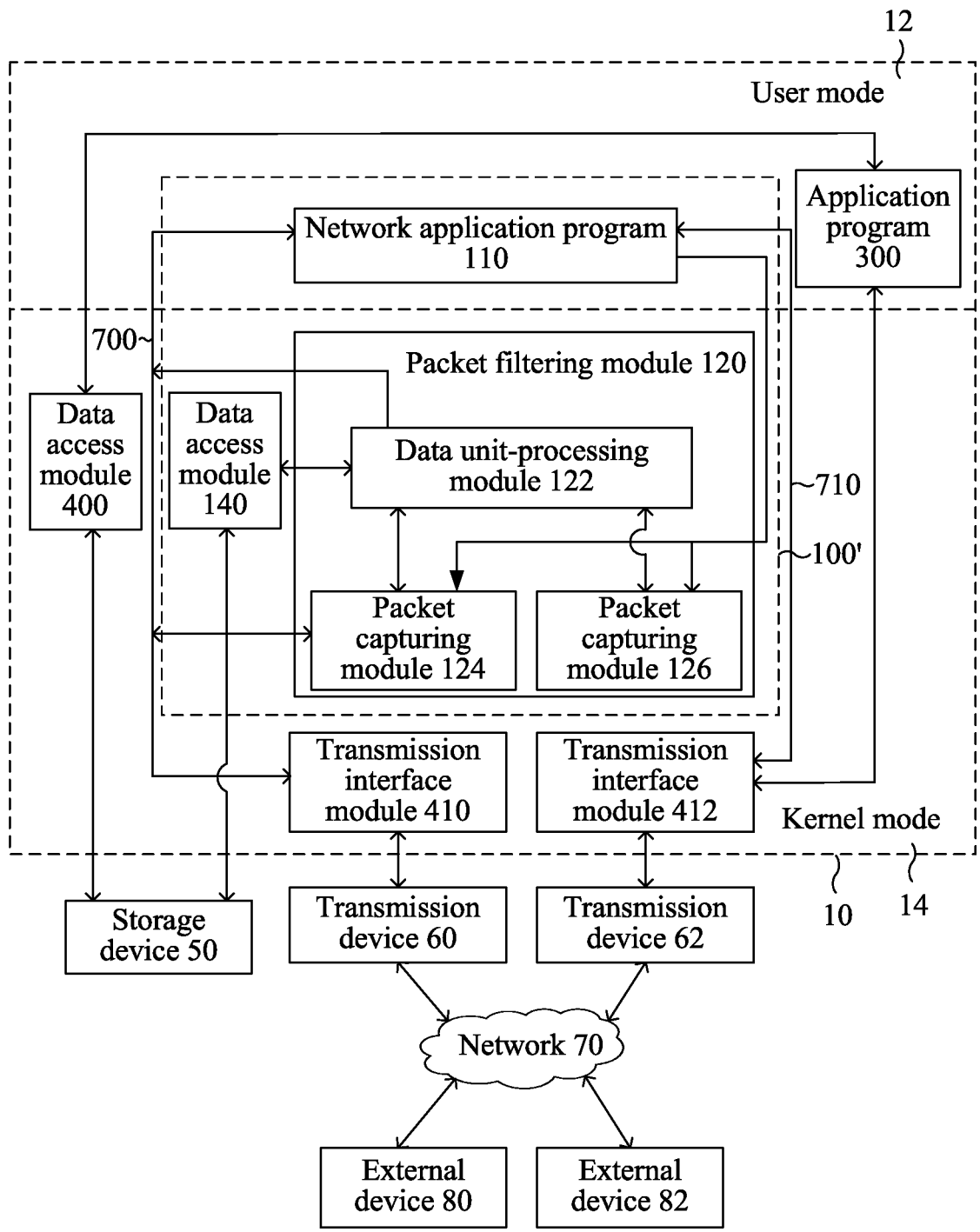
FIG. 1B is a module block diagram illustrating that a network application program product running on an existing operating system according to another embodiment of the present disclosure.

In another embodiment, a data access module executed in the kernel mode is provided in the network application program product 100. Please refer to FIG. 1B, which is a module block diagram illustrating that a network application program product running on an existing operating system according to another embodiment of the present disclosure. In this embodiment, in addition to the network application program 110 and the packet filtering module 120 described in the above embodiment, the network application program product 100' further includes a data access module 140 executed in the kernel mode. According to the design, the data unit-processing module 122 can directly use the data access module 140 but not the data access module 400 to access the storage device 50. Furthermore, since the data access module 140 is designed especially for the network application program product 100', the data access module 140 can optimize the network application program product 100 to raise the overall processing efficiency.

A notable advantage of the present disclosure is that the network application program product and the network packet processing method can be easily applied to the existing network application programs.

Figure 3:
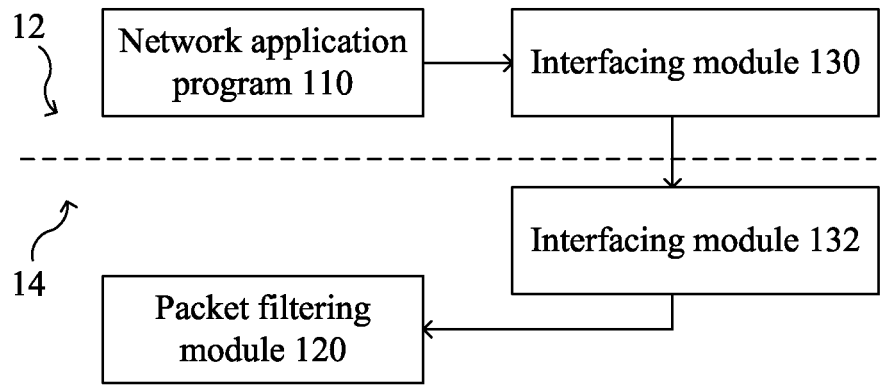
FIG. 3 is a module block diagram illustrating an interfacing channel communicating the network application program with the packet filtering module.

Please refer to FIG. 3, which is a module block diagram illustrating an interfacing channel communicating the network application program with the packet filtering module. In this embodiment, the network application program product 100 further includes interfacing modules 130 and 132. The interfacing module 130 is executed in the user mode 12 of the operating system 10, and the other interfacing module 132 is executed in the kernel mode 14 of the operating system 10. As shown in FIG. 3, in the procedure that the network application program 110 transmits the connection information and other data adequate to the operation of the packet filtering module 120 to the packet filtering module 120, the connection information and related data are transmitted to the interfacing module 130 at first, then are forwarded from the interfacing module 130 to the interfacing module 132, and are forwarded from the interfacing module 132 to the packet filtering module 120 lastly. The concept of the present disclosure can be applied to any existing network application program by just properly modifying the network application program to make the network application program 110 to transmit the connection information and related data to the interfacing module 130 without reconstructing the network application program.

The operation and function of the elements other than the network application program are similar to those as described above.

Figure 4:
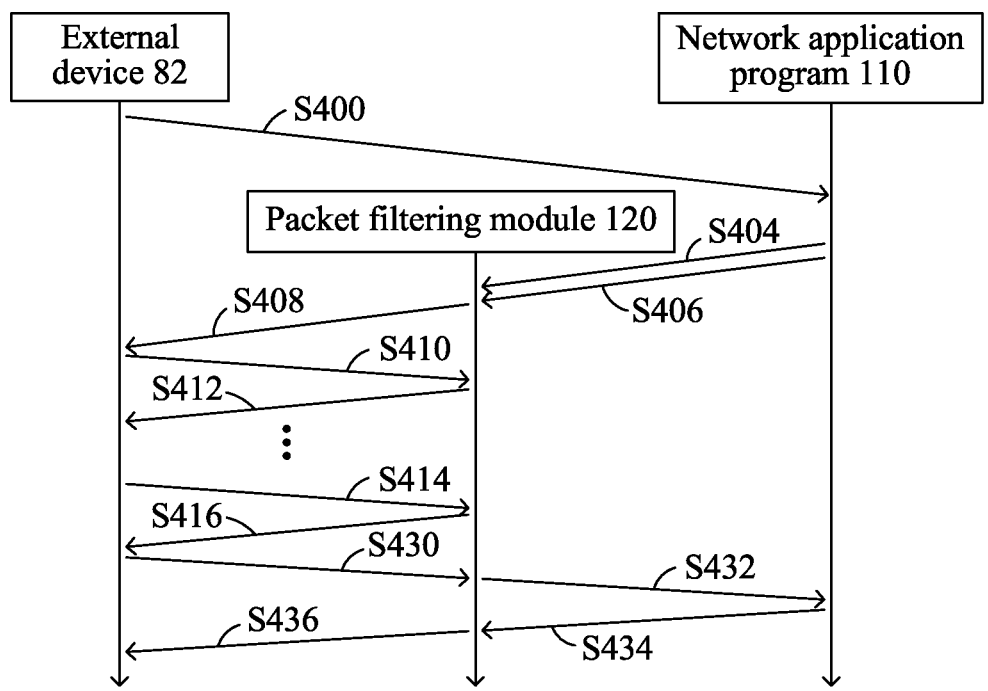
FIG. 4 is a sequence diagram showing data transmission steps in an embodiment of the present disclosure.

Please refer to FIG. 4, which is a sequence diagram showing data transmission steps in an embodiment of the present disclosure. In the diagram, the logic function of and relations among the external device 82, the packet filtering module 120 and the network application program 110 have been illustrated in FIG. 1A or FIG. 1B. The network application program 110 is set to be a network application program with SAMBA server functionality, and the preset code content stored in the packet filtering module 120 includes instruction codes corresponding to the "write" instruction and "read" instruction. Other related details have been described in the above embodiments with reference to FIG. 1A or FIG. 1B, and are not given herein. The network application program of the present disclosure may implemented by SAMBA software, software with server message block (SMB) direct access function or other suitable software. It is not intended to limit the function of the software in the present disclosure.

In the embodiment, at first, the external device 82 issues a "create" instruction (SMB2_CREATE) in step S400 to request the network application program 110 to open a file. At this time, the network data do not go through the packet filtering module 120 because the network application program 110 has not transmitted the connection information to the packet filtering module 120. Therefore, the network data are forwarded to the network application program 110 (step S400). Then, the network application program 110 receives and processes the instruction. After processing the instruction, the network application program 110 obtains the file number corresponding to the opened file, and then transmits the data associated with the file number, the file type and the network connection path to the packet filtering module 120 (step S404). It is to be noted that the data associated with the file number, the file type and the network connection path could be transmitted through the interfacing modules shown in FIG. 3. Afterwards, the network application program 110 sends a response corresponding to the "create" instruction to the packet filtering module 120 through the network connection path (step S406). The packet filtering module 120 forwards the response to the external device 82 (step S408).

After receiving the response corresponding to the "create" instruction, the external device 82 sends a next instruction (e.g. "read" instruction (SMB2_READ) in this embodiment) to the network application program 110 (step S410). At this time, since the network application program 110 has transmitted the connection information to the packet filtering module 120, the packet filtering module 120 captures the "read" instruction to be transmitted to the network application program 110. From the above description, the packet filtering module 120 has received the data associated with the file number, the file type and the network connection path. Once the packet filtering module 120 analyzes the network packet into at least one protocol data unit, the packet filtering module 120 can compare the obtained protocol data unit(s) with the preset code content. Since the preset code content stored in the packet filtering module 120 includes instruction codes corresponding to the "write" instruction and "read" instruction, the comparison result indicates a consistent condition for the "read" instruction. The packet filtering module 120 instructs the data access module 400 in FIG. 1A to access the storage device 50 according to the instruction and related information involving the file number and the file type, or transmits the instruction and related information involving the file number and the file type to the data access module 140 in FIG. 1B to make the data access module 140 to access the storage device 50. The packet filtering module 120 forwards the received information involving the file number and the file type together with the "read" instruction to the data access module 400. After processing the "read" instruction according to the information involving the file number and the file type, the data access module 400 responds to the packet filtering module 120 with the processing result (including the read data), and the packet filtering module 120 directly forwards the processing result to the external device 82 accordingly (step S412).

Similar steps are performed repetitively when the external device 82 continues to read the same file in the storage device 50 until the operations about the last "read" instruction, involving capturing the "read" instruction (step S414), receiving and processing the "read" instruction and responding with the processing result (step S416) as described above. These operations related to the "read" instruction are not processed by the network application program 110, but the packet filtering module 120 in the kernel mode.

After the last "read" instruction, the external device 82 sends a "close" instruction to the network application program 110 (step S430) to indicate that the reading request is ended and the file should be closed. The packet filtering module 120 captures the "close" instruction and analyzes it into protocol data unit(s). Then, the packet filtering module 120 compares the protocol data unit(s) with the preset code content. Since the instruction code corresponding to the "close" instruction carried by the protocol data unit(s) is inconsistent with any instruction code in the preset code content, the packet filtering module 120 forwards the protocol data unit(s) to the network application program 110 (step S432). After receiving the protocol data unit(s) carrying the "close" instruction, the network application program 110 closes the corresponding file and responds to the external device 82 with the processing result through the packet filtering module 120 (steps S434 and S436).

It may be seen in this embodiment that the network application program 110 is only in charge of opening the file, closing the file and transmitting few data to the packet filtering module 120. The other steps such as data access and transmission during the reading procedures are performed by the packet filtering module 120 and the data access module 400 in the kernel mode. Thus, during the execution of the network application program product, less time is required for the data transferring between the kernel mode and the user mode. Therefore, the running efficiency of the network application program product is significantly improved.

It is to be noted that the instructions successively processed by the network application program 110 may not be successive instructions actually. In other words, at least one instruction which is processed by and responded to the packet filtering module 120 may exist between two instructions successively processed by the network application program 110. For one type of communication protocol, this situation is not a problem. For another type of communication protocol, however, the instructions not in a consecutive order sometimes mislead the network application program 110 into judging as network failure or data transmission error. Therefore, for this type of communication protocol, the packet filtering module 120 should modify the protocol data unit(s) to allow the network application program 110 work well while not receiving several protocol data units (e.g. the protocol data units regarding the "reading" instruction and the "writing" instruction as described above) which are captured without reaching to the network application program 110.

For example, if the protocol data units transmitted from the external device 82 are numbered consecutively (hereinafter referred to transmission sequence codes, representing a position of the protocol data unit in the transmission sequence) according to the standard of the communication protocol, the data unit-processing module 122 or the packet capturing module 124/126 of the packet filtering module 120 should check whether the transmission sequence code of the current protocol data unit transmitted to the network application program 110 is next to the transmission sequence code of the previous protocol data unit transmitted to the network application program 110 or not. If the previous protocol data unit and the current protocol data unit are not consecutively numbered, the packet filtering module 120 should modify the transmission sequence code of the current protocol data unit to prevent from misleading the network application program 110. To achieve the modification, the packet filtering module 120 should store at least the last transmission sequence code of the protocol data unit which has been transmitted to the network application program 110 as the reference for the modification.

Similarly, for this type of communication protocol, the packet filtering module 120 should make proper modification to the processing result transmitted from the network application program 110 to the external device 80 to avoid operation error of the external device 80 receiving the response. For example, the external device 80 transmits an instruction with a transmission sequence code A, and the packet filtering module 120 modifies the transmission sequence code of the instruction from A into A' before transmitting the instruction to the network application program 110 in consideration of keeping normal operation under the communication protocol. In this situation, after the network application program 110 processes the instruction and responds, the transmission sequence code A' is included in the responded processing result. If the processing result including the transmission sequence code A' is transmitted to the external device 80, it is predicted that operation error occurs. Therefore, the packet filtering module 120 should further modify the transmission sequence code included in the processing result to return to A before transmitting the processing result to the external device 80 to avoid the operation error.

It is to be noted that the sequence codes of instructions under the specific type of protocol may be numbered and checked according to other sequence rules. The packet filtering module 120 can make proper modifications according to the sequence rules as required, and the details are not specially given herein.

In conclusion, the concept of the present disclosure processes the application layer protocol by applying the user mode and the kernel mode of the operating system. The provided network application program product and the related method for processing the application layer protocol have high running efficiency and are easy to maintain.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory machine readable medium having stored instructions executed in an operating system which provides a user mode and a kernel mode, a data access module operating in the kernel mode of the operating system to perform data access to a storage device, the stored instructions comprising:
 a network application program executed in the user mode, the network application program obtaining an access right to a data storage area in the storage device through the operating system, network connection being established between the network application program and an external device through the operating system, the network application program generating connection information associated with the network connection; and
 a packet filtering module executed in the kernel mode, the packet filtering module capturing at least one to-be-processed packet transmitted from the external device via the network connection according to the connection information, analyzing the at least one to-be-processed packet into at least one protocol data unit, comparing the at least one protocol data unit with preset code content to obtain a comparison result, and transmitting the at least one protocol data unit to one of the network application program and the data access module according to the comparison result to make the one of the network application program and the data access module to operate in response to the at least one protocol data unit,
 wherein when the comparison result shows that the at least one protocol data unit is not consistent with the preset code content, the packet filtering module forwards the at least one protocol data unit to the network application program.

2. The non-transitory machine readable medium having stored instructions according to claim 1, wherein the packet filtering module further comprises:
 at least one packet capturing module capturing the at least one to-be-processed packet according to the connection information and analyzing the at least one to-be-processed packet into the at least one protocol data unit; and
 a data unit-processing module receiving the at least one protocol data unit from the packet capturing module and comparing the at least one protocol data unit with the preset code content to generate the comparison result,
 wherein when the comparison result shows that the at least one protocol data unit is consistent with the preset code content, the data unit-processing module instructs the data access module to perform the data access to the storage device according to the at least one protocol data unit,
 wherein when the comparison result shows that the at least one protocol data unit is not consistent with the preset code content, the data unit-processing module forwards the at least one protocol data unit to the network application program.

3. The non-transitory machine readable medium having the stored instructions according to claim 1, wherein the data unit-processing module modifies the at least one protocol data unit and forwards the at least one modified protocol data unit to the network application program to allow the network application program to keep normal operation when another data access has been performed before the at least one protocol data unit is captured.

4. The non-transitory machine readable medium having the stored instructions according to claim 3, wherein the data unit-processing module modifies the at least one protocol data unit by modifying a transmission sequence code of the at least one protocol data unit, the transmission sequence code representing a position of the protocol data unit in a transmission sequence.

5. The non-transitory machine readable medium having the stored instructions according to claim 1, wherein the network application program is implemented by SAMBA software or software with server message block direct access function.

6. The non-transitory machine readable medium having the stored instructions according to claim 1, wherein the network application program product further comprises the data access module.

7. A method for processing an application layer protocol used with an operating system which provides a user mode and a kernel mode, a network application program being executed in the user mode, a data access module configured to perform data access to a storage device and a packet filtering module corresponding to the network application program being executed in the kernel mode, the packet filtering module storing therein preset code content, the method comprising steps of:
 transmitting connection information, by the network application program, to the packet filtering module, the connection information being associated with network connection established between the network application program and an external device through the operating system;
 capturing, by the packet filtering module, a to-be-processed packet transmitted via the network connection according to the connection information;
 analyzing, by the packet filtering module, the to-be-processed packet into at least one protocol data unit and comparing the at least one protocol data unit with the preset code content to obtain a comparison result; and
 transmitting the at least one protocol data unit to one of the network application program and the data access module according to the comparison result for later processing, wherein when the comparison result shows that the at least one protocol data unit is not consistent with the preset code content, the packet filtering module transmits the at least one protocol data unit to the network application program and the network application program processes the at least one protocol data unit.

8. The method according to claim 7, wherein the packet filtering module modifies the at least one protocol data unit and transmits the at least one modified protocol data unit to the network application program.

9. The method according to claim 8, further comprising steps of:
 the network application program responding to the packet filtering module with a processing result of the at least one protocol data unit; and
 the packet filtering module receiving the processing result from the network application program and transmitting the processing result to the external device,
 wherein if the packet filtering module modifies the protocol data unit transmitted to the network application program, the packet filtering module further modifies the processing result and transmits the modified processing result to the external device.

10. The method according to claim 7, wherein the network application program obtains an access right to a data storage area in the storage device, and the connection information comprises a storage parameter associated with the data storage area in the storage device.

11. The method according to claim 10, wherein when the comparison result shows that the at least one protocol data unit is consistent with the preset code content, the packet filtering module instructs the data access module to perform the data access to the storage device according to the at least one protocol data unit.

* * * * *